(12) United States Patent
Anusuya Rangappa

(10) Patent No.: US 10,275,261 B1
(45) Date of Patent: Apr. 30, 2019

(54) METHODS AND SYSTEMS FOR MESSAGE LOGGING AND RETRIEVAL IN COMPUTER SYSTEMS

(71) Applicant: Cavium, Inc., Aliso Viejo, CA (US)

(72) Inventor: Lohith Anusuya Rangappa, Trabuco Canyon, CA (US)

(73) Assignee: Cavium, LLC, Santa Clara, CA (US)

( * ) Notice: Subject to any disclaimer, the term of this patent is extended or adjusted under 35 U.S.C. 154(b) by 106 days.

(21) Appl. No.: 15/363,995

(22) Filed: Nov. 29, 2016

(51) Int. Cl.
*G06F 9/00* (2006.01)
*G06F 9/24* (2006.01)
*G06F 15/177* (2006.01)
*G06F 9/4401* (2018.01)
*G06F 9/54* (2006.01)

(52) U.S. Cl.
CPC .......... *G06F 9/4411* (2013.01); *G06F 9/4406* (2013.01); *G06F 9/541* (2013.01)

(58) Field of Classification Search
CPC ........................................................ G06F 9/44
See application file for complete search history.

(56) References Cited

U.S. PATENT DOCUMENTS

| | | | | |
|---|---|---|---|---|
| 5,974,546 A * | 10/1999 | Anderson | ........... | G06F 11/2284 713/2 |
| 6,889,340 B1 * | 5/2005 | Bramley, Jr. | ....... | G06F 11/2284 714/30 |
| 7,243,347 B2 * | 7/2007 | Palmer | ....... | G06F 8/65 717/168 |
| 8,276,194 B2 * | 9/2012 | Ma | ....... | H04L 41/0213 370/254 |
| 8,954,805 B2 * | 2/2015 | Liu | ....... | G06F 8/654 714/36 |
| 9,565,130 B2 * | 2/2017 | Mittal | ....... | H04L 47/70 |
| 10,019,203 B1 * | 7/2018 | Dyahadray | ....... | G06F 3/061 |
| 2014/0195848 A1 * | 7/2014 | Teli | ....... | G06F 11/1469 714/15 |

* cited by examiner

*Primary Examiner* — Mohammed H Rehman
(74) *Attorney, Agent, or Firm* — Klein, O'Neill & Singh, LLP

(57) ABSTRACT

Methods and systems for a computing device and an adapter are provided. One method includes allocating a memory location at the adapter for storing messages logged by a driver during a pre-boot operation of an operating system of the computing device coupled to the driver; generating a variable by the driver executed by the computing device, the variable includes an address of the memory location and is identified by a unique identifier; using a first application programming interface (API) by the driver for enabling message logging at the memory location during the pre-boot operation; retrieving the address of the memory location by a second API using the unique identifier of the variable; and obtaining by the second API on behalf of an application executed by the computing device, a message logged at the memory location by the driver during the pre-boot operation.

20 Claims, 4 Drawing Sheets

METHODS AND SYSTEMS FOR MESSAGE LOGGING AND RETRIEVAL IN COMPUTER SYSTEMS

TECHNICAL FIELD

The present invention relates to message logging and retrieval in computer systems.

BACKGROUND

Computing systems are commonly used today. A computing system often communicates with a peripheral device, for performing certain functions, for example, an adapter for reading and writing information and providing access to storage networks and other network devices.

Often there may be errors when a computer system is booting i.e. initializing. To debug and correct initialization problems, an application or a utility may need to review pre-boot message logs. Conventional systems today do not provide an efficient method for logging pre-boot messages and retrieval of pre-boot messages. Continuous efforts are being made for improving computing technology as well to develop techniques that are useful in debugging errors.

BRIEF DESCRIPTION OF THE DRAWINGS

The various aspects relating to securing data network now will be discussed in detail with an emphasis on highlighting the advantageous features. These novel and non-obvious aspects are shown in the accompanying drawings, which are for illustrative purposes only. These drawings include the following figures, in which like numerals indicate like parts.

DETAILED DESCRIPTION

Figure 1A:
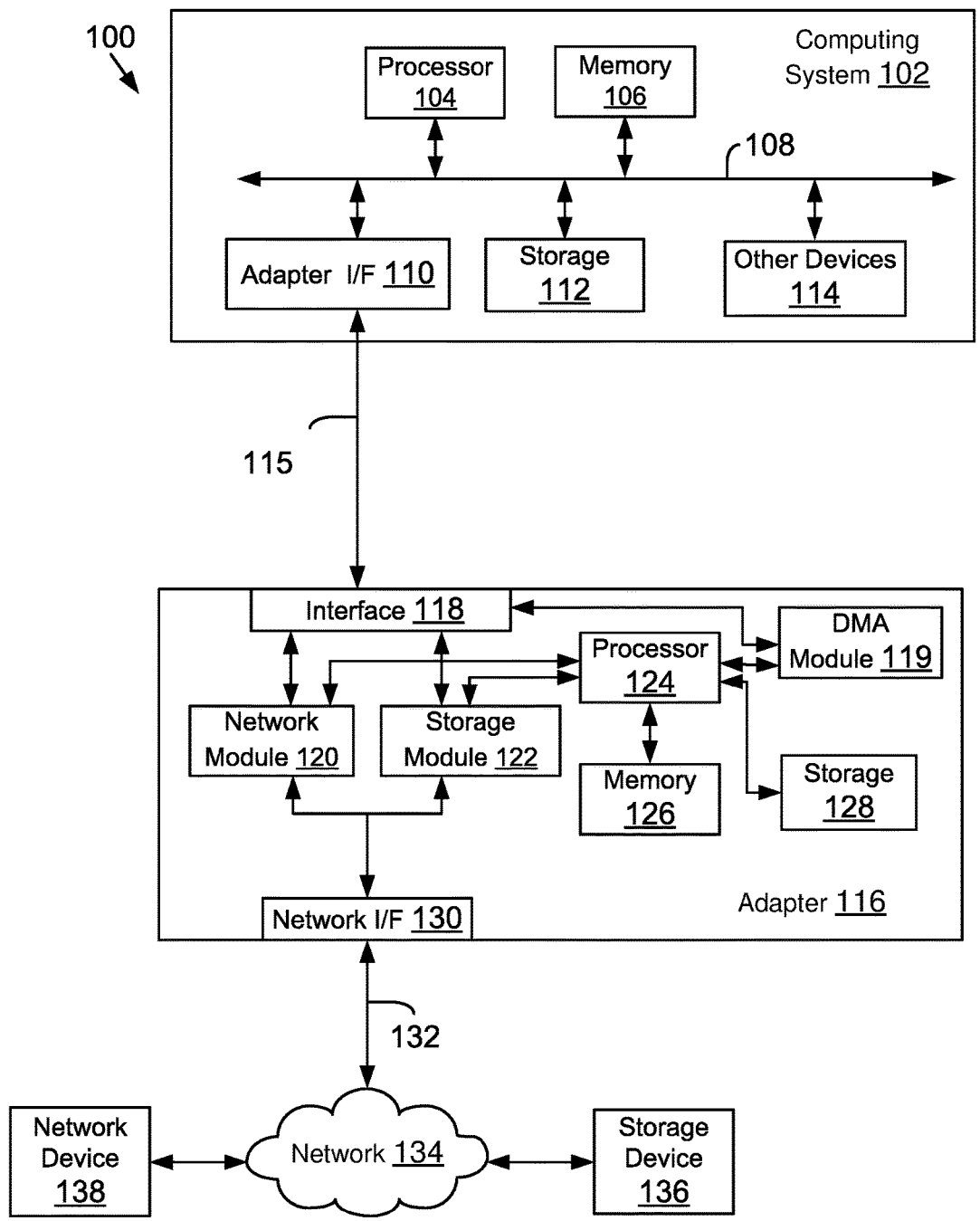
FIG. 1A is a functional block diagram of system with a computing system and an adapter, according to one aspect of the present disclosure.

The following detailed description describes the various present aspects with reference to the drawings. In the drawings, reference numbers label elements of the present aspects. These reference numbers are reproduced below in connection with the discussion of the corresponding drawing features.

As a preliminary note, any of the aspects described with reference to the figures may be implemented using software, firmware, hardware (e.g., fixed logic circuitry), manual processing, or a combination of these implementations. The terms "logic", "module", "component", "system", and "functionality", as used herein, generally represent software, firmware, hardware, or a combination of these elements. For instance, in the case of a software implementation, the terms "logic", "module", "component", "system", and "functionality" represent program code that performs specified tasks when executed on a hardware processing device or devices (e.g., CPU or CPUs). The program code can be stored in one or more non-transitory computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of non-transitory storage medium for retaining information in any form, including various kinds of storage devices (magnetic, optical, static, etc.).

The various aspects disclosed herein, may be implemented as a computer process (method), a computing system, or as an article of manufacture, such as a computer program product or computer-readable media. The computer program product is non-transitory computer storage media, readable by a computing device, and encoding a computer program of instructions for executing a computer process.

In one aspect a method for a computing device and an adapter is provided. One method includes allocating a memory location at the adapter for storing messages logged by a driver during a pre-boot operation of an operating system of the computing device coupled to the driver; generating a variable by the driver executed by the computing device, the variable includes an address of the memory location and is identified by a unique identifier; using a first application programming interface (API) by the driver for enabling message logging at the memory location during the pre-boot operation; retrieving the address of the memory location by a second API using the unique identifier of the variable; and obtaining by the second API on behalf of an application executed by the computing device, a message logged at the memory location by the driver during the pre-boot operation.

In another aspect, a non-transitory, machine readable storage medium having stored thereon instructions for performing a method is provided. The instructions include machine executable code which when executed by at least one machine, causes the machine to: allocate a memory location at an adapter for storing messages logged by a driver during a pre-boot operation of an operating system of a computing device coupled to the driver; generate a variable by the driver executed by the computing device, the variable includes an address of the memory location and is identified by a unique identifier; use a first API by the driver for enabling message logging at the memory location during the pre-boot operation; retrieve the address of the memory location by a second API using the unique identifier of the variable; and obtain by the second API on behalf of an application executed by the computing device, a message logged at the memory location by the driver during the pre-boot operation.

In yet another aspect, a system having a computing device with a processor executing a driver and an application is provided. The computing device interfaces with an adapter having a memory location for storing messages logged by the driver during a pre-boot operation. The driver generates a variable that includes an address of the memory location and is identified by a unique identifier. A first API enables message logging at the memory location during the pre-boot operation; and a second API retrieves the address of the memory location using the unique identifier of the variable; and then obtains a message logged at the memory location by the driver during the pre-boot operation on behalf of an application executed by the computing device.

System 100: FIG. 1A shows an example of a system 100 configured for use with the various aspects of the present disclosure. System 100 may include one or more computing system 102 (may also be referred to as "host system 102") coupled to an adapter 116 via an adapter interface 110 and a link 115. Link 115 may be an interconnect system, for example, PCI-Express (PCIe) link or any other interconnect type. The adapter 116 interfaces with a storage device 136 and a network device 138 via a network 134 using a network link 132. The network 134 may include, for example, additional computing systems, servers, storage systems, etc.

The computing system 102 may include one or more processors 104, also known as a central processing unit (CPU). Processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices. The processor 104 executes computer-executable process steps and interfaces with an interconnect (or computer bus) 108. The computer bus 108 may be, for example, a system bus, a Peripheral Component Interconnect (PCI) bus (or PCI-Express (PCIe) bus), a HyperTransport or industry standard architecture (ISA) bus, a SCSI bus, a universal serial bus (USB), an Institute of Electrical and Electronics Engineers (IEEE) standard 1394 bus (sometimes referred to as "Firewire"), or any other interconnect type.

The computing system 102 also includes other devices and interface 114, which may include a display device interface, a keyboard interface, a pointing device interface, etc. Details regarding the other devices 114 are not germane to the aspects disclosed herein.

The computing system 102 may further include a storage device 112, which may be for example a hard disk, a CD-ROM, a non-volatile memory device (flash or memory stick) or any other mass storage device. Storage 112 may store operating system programs and data structures, application program data, and other data. Some of these files are stored on storage 112 using an installation program. For example, the processor 104 may execute computer-executable process steps of an installation program so that the processor 104 can properly execute the application program.

Memory 106 also interfaces with the computer bus 108 to provide the processor 104 with access to memory storage. Memory 106 may include random access main memory (RAM) or any other memory type. When executing stored computer-executable process steps from storage 112, processor 104 may store and execute the process steps out of RAM. Read only memory (ROM, not shown) may also be used to store invariant instruction sequences, such as start-up instruction sequences or basic input/output system (BIOS) sequences).

In one aspect, adapter 116 may be configured to handle both network and storage traffic. Various network and storage protocols may be used to handle network and storage traffic. Some common protocols/technologies are described below.

One common network protocol is Ethernet. The original Ethernet bus or star topology was developed for local area networks (LAN) to transfer data at 10 Mbps (mega bits per second). Newer Ethernet standards (for example, Fast Ethernet (100 Base-T) and Gigabit Ethernet) support higher data transfer rates for example, above 100 Mbps. The descriptions of the various aspects described herein are based on using Ethernet (which includes 100 Base-T and/or Gigabit Ethernet) as the network protocol. However, the adaptive aspects disclosed herein are not limited to any particular protocol, as long as the functional goals are met by an existing or new network protocol.

One common storage technology used to access storage systems is Fibre Channel (FC). Fibre Channel is a set of American National Standards Institute (ANSI) standards that provide a serial transmission protocol for storage and network protocols such as HIPPI, SCSI, IP, ATM and others. Fibre Channel supports three different topologies: point-to-point, arbitrated loop and fabric. The point-to-point topology attaches two devices directly. The arbitrated loop topology attaches devices in a loop. The fabric topology attaches computing systems directly (via HBAs) to a fabric, which are then connected to multiple devices. The Fibre Channel fabric topology allows several media types to be interconnected. Fibre Channel fabric devices include a node port or "N_Port" that manages Fabric connections. The N_port establishes a connection to a Fabric element (e.g., a switch) having a fabric port or F_port.

Fibre Channel over Ethernet (FCOE) has been developed to handle both Ethernet and Fibre Channel traffic in a storage area network (SAN). This functionality enables Fibre Channel to leverage high-speed Ethernet networks while preserving the Fibre Channel protocol. The adapter 116 shown in FIG. 1A may be configured to operate as an FCOE adapter and may be referred to as FCOE adapter 116. The illustrated adapter 116, however, does not limit the scope of the present aspects. The present aspects may be practiced with adapters having different configurations.

Referring back to FIG. 1A, adapter 116 interfaces with the host 102 via the link 115 and interface 118. In one aspect, interface 118 may be a PCI Express interface having logic/circuitry for sending and receiving PCI-Express packets.

The adapter 116 may also include a processor 124 that executes firmware instructions out of a memory 126 to control overall adapter operations. The adapter 116 may also include local storage 128, which may be for example non-volatile memory, such as flash memory, or any other device. The local storage 128 may store executable instructions and operating parameters that can be used for controlling adapter operations.

The adapter 116 includes a network module 120 for handling network traffic via a link 132. In one aspect, the network module 120 includes logic and circuitry for handling network packets, for example, Ethernet or any other type of network packets. The network module 120 may include memory buffers (not shown) to temporarily store information received from other network devices 138 and transmitted to other network devices 138.

The adapter 116 may also include a storage module 122 for handling storage traffic to and from storage devices 136. The storage module 112 may further include memory buffers (not shown) to temporarily store information received from the storage devices 136 and transmitted by the adapter 116 to the storage devices 136. In one aspect, the storage module 122 is configured to process storage traffic according to the Fibre Channel storage protocol, or any other protocol. It is noteworthy that adapter 116 may only have a network module 120 or a storage module 122. The various aspects described herein are not limited to any particular adapter type.

The adapter 116 also includes a network interface 130 that interfaces with the link 132 via one or more ports (not shown). The network interface 130 includes logic and circuitry to receive information via the network link 132 and pass it to either the network module 120 or the storage module 122, depending on the packet type.

Adapter 116 also includes a direct memory access (DMA) module 119 that is used to manage access to link 151. The DMA module 119 uses a plurality of DMA channels (not shown) for managing access to link 115. The DMA channels are typically used to move control structures such as Input/Output control blocks (IOCBs), input/output status blocks (IOSBs) and data between host system memory 106 and the adapter memory 126.

Figure 1B:
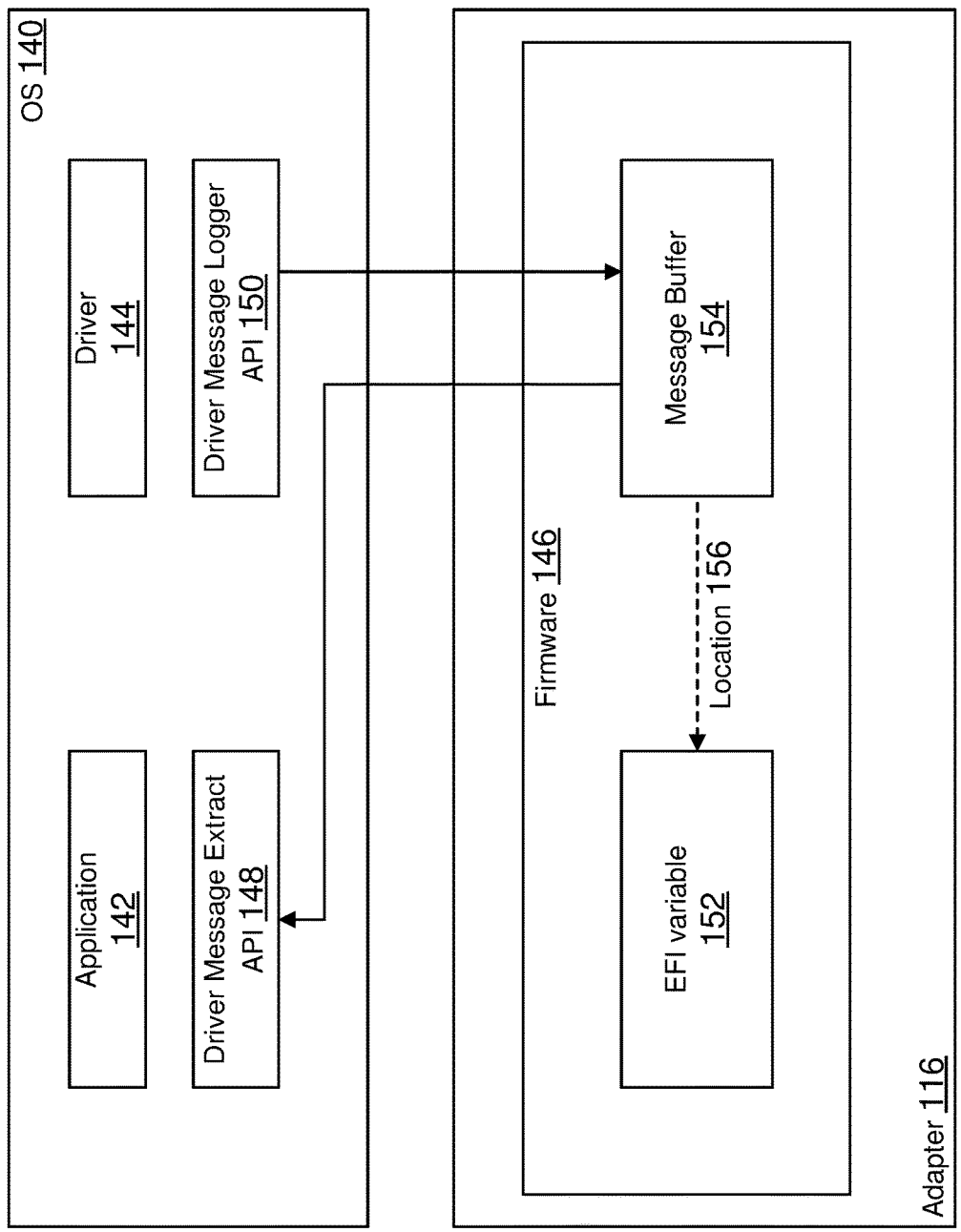
FIG. 1B shows a block diagram of a generic software architecture used by the system of FIG. 1A.

Software Architecture:

FIG. 1B shows an example of a generic software architecture used by the various components of system 100. Processor 104 of the host system 102 executes an operating system 140 for controlling the overall operations of the host computing system 102. The operating system may be Windows based, Linux operating system, Solaris, or any other operating system type (without derogation of any third party trademark rights). The various aspects disclosed herein are not limited to any particular operating system type.

An application 142 may be executed by processor 104 for performing certain functions. For example, application 142 may be for retrieving messages that are logged, according to one aspect of the present disclosure. In one aspect, a driver message extract application programming interface 148 (maybe referred to as API 148) is provided to retrieve logged messages, as described below in detail. API 148 may be integrated with application 142 or provided as a stand-alone module.

A unified extended firmware interface (UEFI) driver 144 is executed by the host system 102 to interface with the firmware 146 executed by processor 124 of adapter 116. Firmware 146 is used to control the overall operations of adapter 116. A driver message logger API 150 (may be referred to as API 150) is provided to manage message logging by adapter 116. API 150 may be integrated with driver 144 or provided as a separate module that interfaces with the driver 144.

In one aspect, firmware 146 complies with the unified extended firmware interface (UEFI) specification provided by the UEFI Forum (without derogation of any third party trademark rights). UEFI is a software interface between an operating system and a device firmware.

In one aspect, the driver 144 creates an extended firmware interface (EFI) variable 152 with an unique identifier (for example, a global unique identifier (GUID)). The EFI variable 152 may be stored at host memory 106 by the driver 144. A message buffer 154 is allocated and assigned to store messages that are logged during a pre-boot operation of operating system 140. The size of the message buffer 154 varies based on whether logged messages are retrieved during run-time or boot-time. The address/location 156 of the message buffer is included in the EFI variable 152. The message logging is enabled by API 150. The logged messages are retrieved by API 148 using the EFI variable 152, as described below in detail.

Figure 2:
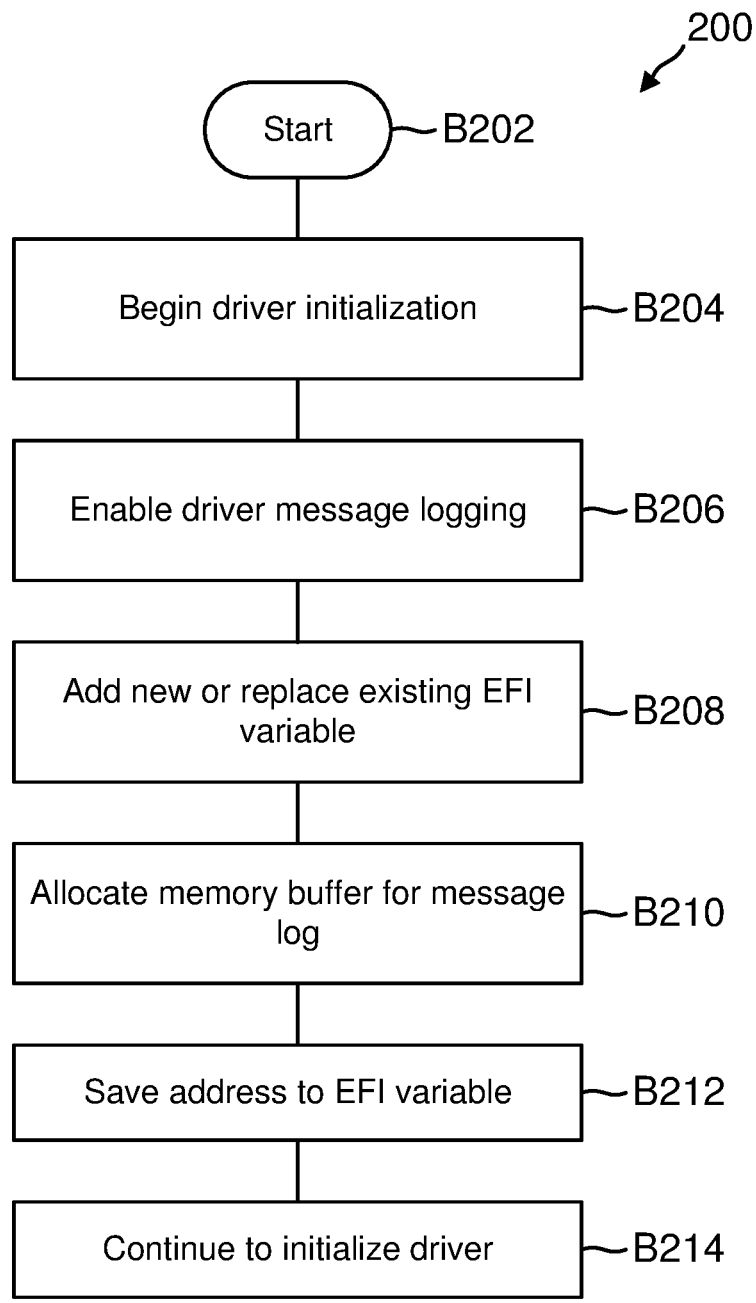
FIG. 2 shows a process flow for configuring an adapter for logging pre-boot messages, according to one aspect of the present disclosure.

Process Flow:

FIG. 2 shows a process 200 for configuring the message buffer 154 and the EFI variable 152, according to one aspect of the present disclosure. The process begins in block B202. In block B204, driver 144 initialization begins. The driver message logging is enabled in block B206. The message logging maybe enabled using API 150 that may specify the message types that are logged, for example, a driver message when firmware 146 fails to initialize a network link 132 for sending or receiving data or any other message type.

In block B208, a new EFI variable 152 is created or an existing EFI variable may be replaced by the driver 144. The EFI variable 152 is identified by a unique identifier. The EFI variable 152 is created prior to installing any UEFI binding protocols. The UEFI binding protocols are defined by the UEFI specification. The binding protocols provide functions for starting and stopping the driver 144, as well as functions for determining whether the driver can manage a particular device.

In block B210, the memory buffer 154 is allocated for storing messages that are logged by driver 144. The message buffer 154 maybe a UEFI boot services memory, runtime memory or any other memory type. Based on the memory type, a certain buffer size and location 156 is assigned. In block B212, the location 156 is saved as part of the EFI variable 152. The driver 144 then continues to initialize in block B214, until the driver 144 is fully initialized and operational.

Figure 3:
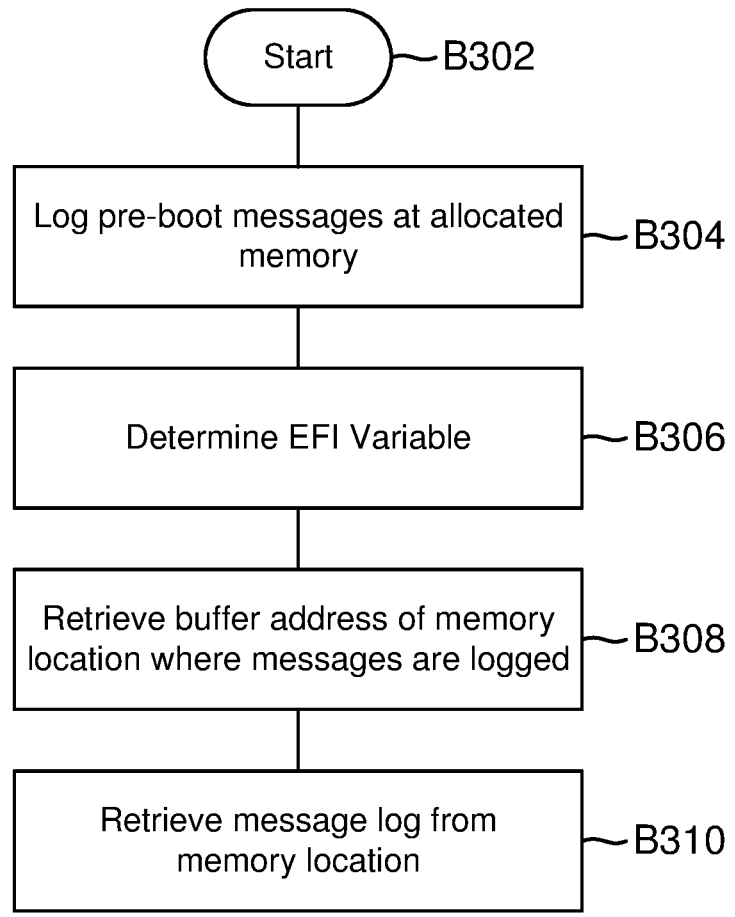
FIG. 3 shows a process flow for retrieving pre-boot messages, according to one aspect of the present disclosure.

FIG. 3 shows a process 300 for logging and retrieving driver 144 messages during a pre-boot operation, according to one aspect of the present disclosure. The term "pre-boot" as used herein is a stage that occurs before the driver 144 and operating system 140 have been completely initialized (or booted) for operation. Process 300 may be executed to retrieve logged messages during boot time or run-time of driver 144/operating system 140.

Process 300 begins in block B302, when the message buffer 154 has been allocated and the EFI variable 152 has been updated with the location of the message buffer.

In block B304, the driver 144 during pre-boot, logs messages. The messages are stored at memory buffer 154 by API 150. Examples of logged messages include failure messages for example, NVRAM access failure, status messages for example, boot progress messages, adapter initialization sequence messages and others.

To retrieve the messages, in block B306, API 148 determines the EFI variable 152 from host memory 106. In one aspect, API 148 searches for the EFI variable 152 using the GUID of the EFI variable. After the EFI variable 152 is determined, in block B308, API 148 extracts the buffer address from the EFI variable. The logged message is then retrieved in block B310 from the message buffer 154.

The APIs 148 and 150 enable efficient message logging and retrieval. Conventional debugging options provided by the UEFI specification depend on the UEFI firmware to provide APIs and are not available during run-time of software at the host systems. Furthermore, conventional systems do not provide an efficient mechanism for logging messages during a pre-boot operation. The technology disclosed herein improves overall computing technology by providing a structure and methodology for retrieving driver messages that are logged during boot phase of the host system software/hardware.

The above description presents the best mode contemplated for carrying out the present aspects, and of the manner and process of making and using them, in such full, clear, concise, and exact terms as to enable any person skilled in the art to which they pertain to make and use these aspects. These aspects are, however, susceptible to modifications and alternate constructions from that discussed above that are fully equivalent. For example, the aspects disclosed herein are applicable to any peripheral device and are not limited to any particular adapter type. Consequently, these aspects are not limited to the particular aspects disclosed. On the contrary, these aspects cover all modifications and alternate constructions coming within the spirit and scope of the aspects as generally expressed by the following claims, which particularly point out and distinctly claim the subject matter of the aspects.

What is claimed is:

1. A machine implemented method, comprising:

allocating a memory location at an adapter for storing messages logged by a driver during a pre-boot operation of an operating system of a computing device, the driver executed by the computing device to interface with the adapter using a peripheral link;

generating a variable by the driver executed by the computing device, the variable includes an address of the memory location and is identified by a unique identifier;

using a first application programming interface (API) by the driver for enabling message logging at the memory location during the pre-boot operation;

retrieving the address of the memory location by a second API using the unique identifier of the variable; and obtaining by the second API on behalf of an application executed by the computing device, a message logged at the memory location by the driver during the pre-boot operation; wherein the application generates requests for the adapter to communicate with a networked storage device.

2. The method of claim 1, wherein the message is obtained by the second API during run-time when the operating system is running.

3. The method of claim 1, wherein the message is obtained by the second API during boot-time.

4. The method of claim 1, wherein the variable is generated prior to installing a binding protocol.

5. The method of claim 1, wherein a size of the memory location varies based on whether logged messages are obtained during boot time or run-time.

6. The method of claim 1, wherein the first API is integrated with the driver.

7. The method of claim 1, wherein the second API is integrated with the application.

8. A non-transitory, machine readable storage medium having stored thereon instructions for performing a method, comprising machine executable code which when executed by at least one machine, causes the machine to:

allocate a memory location at an adapter for storing messages logged by a driver during a pre-boot operation of an operating system of a computing device, the driver executed by the computing device to interface with the adapter using a peripheral link;

generate a variable by the driver executed by the computing device, the variable includes an address of the memory location and is identified by a unique identifier;

use a first application programming interface (API) by the driver for enabling message logging at the memory location during the pre-boot operation;

retrieve the address of the memory location by a second API using the unique identifier of the variable; and obtain by the second API on behalf of an application executed by the computing device, a message logged at the memory location by the driver during the pre-boot operation; wherein the application generates requests for the adapter to communicate with a networked storage device.

9. The storage medium of claim 8, wherein the message is obtained by the second API during run-time when the operating system is running.

10. The storage medium of claim 8, wherein the message is obtained by the second API during boot-time.

11. The storage medium of claim 8, wherein the variable is generated prior to installing a binding protocol.

12. The storage medium of claim 8, wherein a size of the memory location varies based on whether logged messages are obtained during boot time or run-time.

13. The storage medium of claim 8, wherein the first API is integrated with the driver.

14. The storage medium of claim 8, wherein the second API is integrated with the application.

15. A system comprising:

a computing device having a processor executing a driver and an application, the computing device interfacing with an adapter via the driver, the adapter having a memory location for storing messages logged by the driver during a pre-boot operation;

wherein the driver generates a variable that includes an address of the memory location and is identified by a unique identifier;

wherein a first application programming interface (API) enables message logging at the memory location during the pre-boot operation; and wherein a second API retrieves the address of the memory location using the unique identifier of the variable; and then obtains a message logged at the memory location by the driver during the pre-boot operation on behalf of an application executed by the computing device.

16. The system of claim 15, wherein the message is obtained by the second API during run-time when the operating system is running.

17. The system of claim 15, wherein the message is obtained by the second API during boot-time.

18. The system of claim 15, wherein the variable is generated prior to installing a binding protocol.

19. The system of claim 15, wherein a size of the memory location varies based on whether logged messages are obtained during boot time or run-time.

20. The system of claim 15, wherein the first API is integrated with the driver and the second API is integrated with the application.

* * * * *